United States Patent Office 3,420,851
Patented Jan. 7, 1969

3,420,851
NOVEL DIBENZOXEPINES
Barry M. Bloom, Lyme, and James R. Tretter, Niantic,
Conn., assignors to Chas. Pfizer & Co., Inc., New York,
N.Y., a corporation of Delaware
No Drawing. Continuation-in-part of application Ser. No.
179,471, Mar. 13, 1962. This application Dec. 19, 1962,
Ser. No. 245,643
U.S. Cl. 260—333                            10 Claims
Int. Cl. C07d 9/00

This invention relates to new and useful compounds possessing a novel structure, the dibenz-[b,e]-oxepine-11-ones. More specifically, it is concerned with substituted dibenzoxepine-11-ones, with 11-alkylaminoalkylidene derivatives thereof, and with the pharmaceutically-acceptable acid addition salts of said derivatives; these compounds are valuable as psychotherapeutic agents and as intermediates in the production of such agents.

The present application is a continuation-in-part of the earlier filed patent application, Ser. No. 179,471, filed Mar. 13, 1962, by Barry M. Bloom and James R. Tretter now abandoned.

The new compounds contemplated by the present invention are selected from the group consisting of those of the formula:

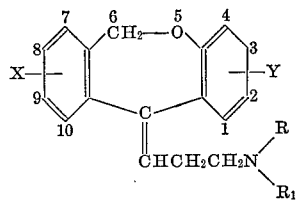

and the pharmaceutically-acceptable acid-addition salts thereof, wherein X and Y are each selected from the group consisting of hydrogen, lower alkyl, lower alkoxy, lower thioalkoxy, chloro, fluoro, trifluoromethyl, lower acyl and lower dialkylsulfonamido; R is selected from the group consisting of hydrogen and methyl; and $R_1$ is selected from the group consisting of lower alkyl, lower alkenyl and lower cycloalkyl. It is to be understood that the terms "lower alkyl," "lower alkoxy," "lower thioalkoxy," "lower acyl," "lower alkenyl" and "lower cycloalkyl" when used in this specification and in the appended claims contemplate said groups containing from 1 to about 4 carbon atoms. The compounds of this invention are valuable for the chemotherapy of mental disease and especially for the treatment of depressed states. These agents are also of use as regulators of the autonomic nervous system and they exhibit antiserotonin, antihistaminic and anticholinergic activity; they are also appetite stimulants.

Particularly valuable for this purpose are compounds of the following formula:

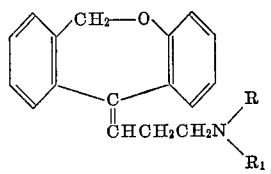

wherein R is selected from the group consisting of hydrogen and methyl and $R_1$ is lower alkyl.

The instant invention also contemplates compounds of the following formula:

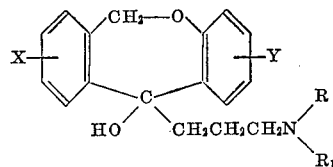

wherein X, Y, R and $R_1$ have the meanings hereinbefore defined. These novel 11-(alkylaminopropyl)-6,11-dihydrodibenz-[b,e]-oxepine-11-ols are particularly useful as intermediates in the synthesis of the alkylaminopropylidene derivatives which have valuable physiological properties.

The instant invention, in addition, contemplates dibenz-[b,e]-oxepin-11-ones of the following formula:

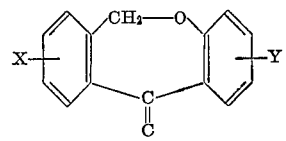

wherein X and Y have the means hereinbefore defined. These novel dibenzoxepin-11-ones are particularly useful in the preparation of the above mentioned alkylaminopropylidene derivatives with valuable physiological properties.

The compounds of the instant invention are conveniently prepared by the reactions represented by the following equations:

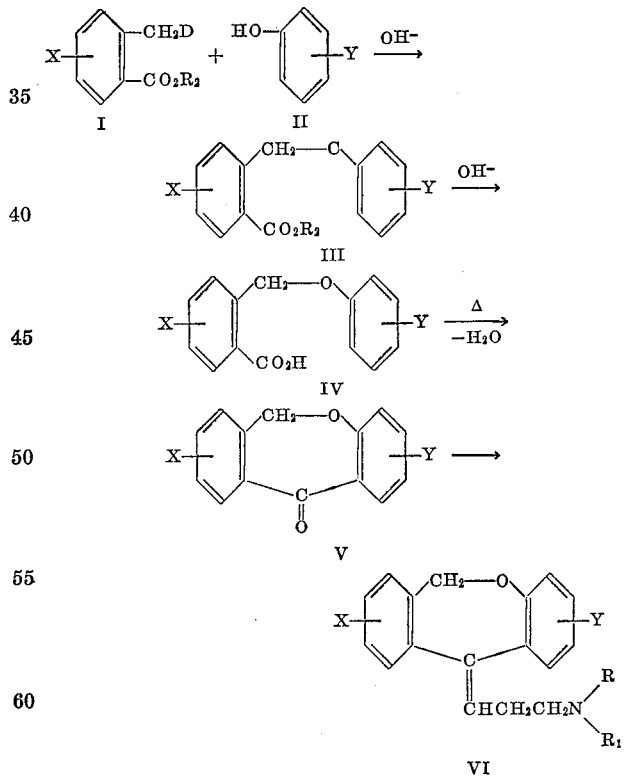

wherein X, Y, R and $R_1$ are as hereinbefore defined; D represents a displaceable group such as, for example, halogen (Hal, e.g., chloro, bromo, iodo), methane sulfonyl, toluene sulfonyl, and the like; and $R_2$ represents an alkyl group preferably containing between 1 and about 5 carbon atoms.

The starting materials for the synthesis of the compounds of the present invention are readily available commercially or may be easily prepared. Thus, for example, ethyl o-bromomethylbenzoate (Compound I, X=H, D=Br, $R_2=C_2H_5$) is prepared by the series of reactions represented by the following equations:

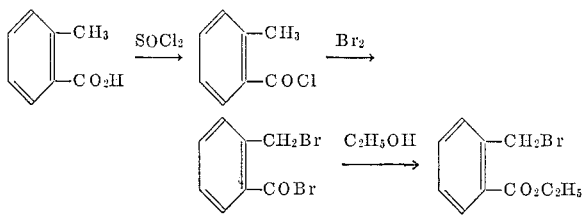

The reaction of o-toluic acid is carried out with at least equimolar and preferably an excess amount of thionyl chloride. It is convenient to employ excess thionyl chloride as the reaction solvent and, after heating the reaction mixture to refluxing temperatures from about ½ to about four hours, to distill the unreacted thionyl chloride from the reaction mixture at a reduced pressure. The product may be purified, as by distillation or by other means, but it is of sufficient purity to use directly in the next step. The o-methyl-benzoyl chloride is treated with an equimolar ratio or slight excess of bromine for from about 1 hour to about four hours at temperatures of from about 100 degrees C. to about 200 degrees C. The excess crude bromine is removed by distillation and the o-bromomethylbenzoyl bromide is added to ethanol. This reaction is preferably conducted at low temperatures to minimize undesirable side reactions such as lactone formation. An especially preferred temperature for this reaction is about 10 degrees C. The product is isolated by removal of the solvent by distillation in a vacuum.

The substituted phenols used as starting materials (II) in the above described process for the preparation of compounds of the present invention are readily available commercially or may be easily prepared.

The substituted o-phenoxymethylbenzoate esters (III) can be prepared by reaction of a suitably substituted o-halomethylbenzoate ester (I) with a substituted phenol (II). This reaction is preferably carried out in the presence of enough alkali metal hydroxide, for example, sodium hydroxide, to convert the phenol completely to its salt form. There is employed at least an equimolar ratio of phenolate to o-halomethylbenzoate ester (I) and the reaction is conveniently carried out in the presence of about 2 volumes of water. Since the intermediate ester (I) and the product (III) are insoluble in the reaction mixture, vigorous stirring is required to obtain good yields. It is preferred to carry out this reaction at temperatures of from about 25 to about 110 degrees and for times of from about 1 to about 5 hours. The product can be isolated by extraction from the reaction mixture into an equal volume of organic solvent, such as benzene, cyclohexane, and the like, followed by evaporation of the solvent from the extract. The product can be further purified by distillation at pressure of below about 1 mm. Hg.

The o-phenoxymethylbenzoic acid intermediates (IV) in the reaction scheme outlined above are conveniently prepared by hydrolysis of the corresponding esters (III). Since there is some tendency for the benzyl ether linkage to be cleaved by acidic reagents, it is preferred to conduct the hydrolysis in the presence of a basic catalyst. An especially convenient procedure is to reflux a mixture of the ester (III) with about 10 volumes of 10 percent aqueous sodium hydroxide solution and about 5 volumes of ethanol. After a reaction period of from about 24 to about 96 hours, the reaction mixture is cooled and extracted with an equal volume of benzene and after acidification to a pH of below 2 with mineral acid, the product is extracted into benzene. The o-phenoxymethyl benzoic acid (IV) is isolated by evaporation of the benzene solvent and can be further purified by recrystallization from ethanol or mixtures of ethanol and water.

The 6,11-dihydrodibenz-[b,e]-oxepin-11-ones (V) of the present invention are conveniently prepared by cyclization of the corresponding o-phenoxymethyl benzoic acids (IV). This cyclization will occur readily in the presence of dehydrating agents. Among the dehydrating agents which have been found to be effective in promoting this reaction are hydrofluoric acid, phosphorous oxide and trifluoroacetic anhydride. Especially preferred because it promotes cyclization in the highest yield is trifluoroacetic anhydride. It is preferred to carry out the reaction in the presence of from about one to about ten volumes of trifluoroacetic anhydride per volume of acid (IV). 6,11-Dihydrodibenz-[b,e]-oxepin-11-one, for example, can be prepared by adding o-phenoxymethyl benzoic acid portionwise to four volumes of trifluoroacetic anhydride over a period of about 30 minutes and stirring the resulting mixture at room temperature for an additional four hours. The product is isolated by pouring the reaction mixture into 5 volumes of water, making the aqueous suspension strongly basic with sodium hydroxide, extracting the organic layer into benzene and evaporating the benzene extract. The oxepine-11-ones of the present invention can be further purified by recrystallization from hexane or from methanol or ethanol or from mixtures of methanol and water.

Conversion of the new 6,11-dihydrodibenz-[b,e]-oxepin-11-ones (V) to the psychotherapeutically active aminoalkylidene derivatives (VI) of the present invention may be accomplished in a variety of ways. Thus, a substituted dibenzoxepine can be reacted with the Grignard reagent prepared from an appropriate 3-alkylaminopropyl halide and the compounds of the present invention are obtained by dehydration of the 11-hydroxy compound (VII) formed thereby. This sequence is represented by the following equations:

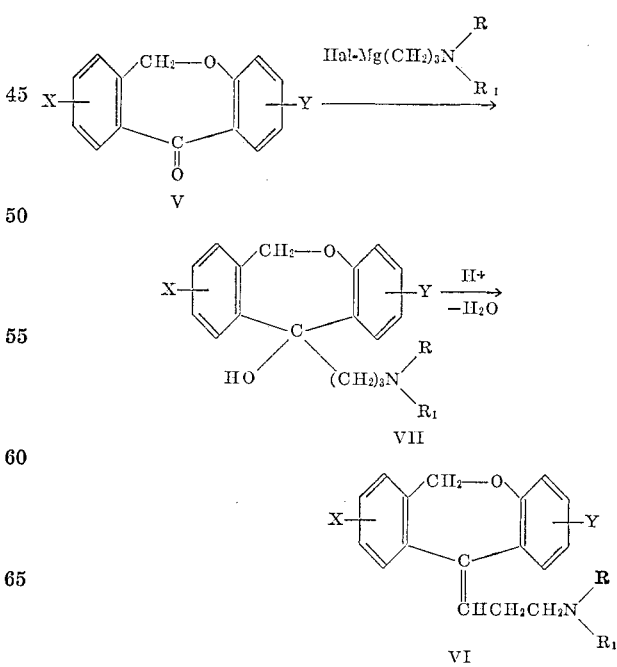

wherein X, Y, Hal, $R_1$ and R are as hereinbefore defined.

Alternatively, the compounds of the present invention can be prepared by reaction of the appropriate oxepin-11-one with an allylmagnesium halide Grignard reagent, followed by dehydration of the 11-hydroxy compound (VIII) formed thereby and amination of the β-olefinic linkage of Compound IX. This reaction sequence is represented by the following equations:

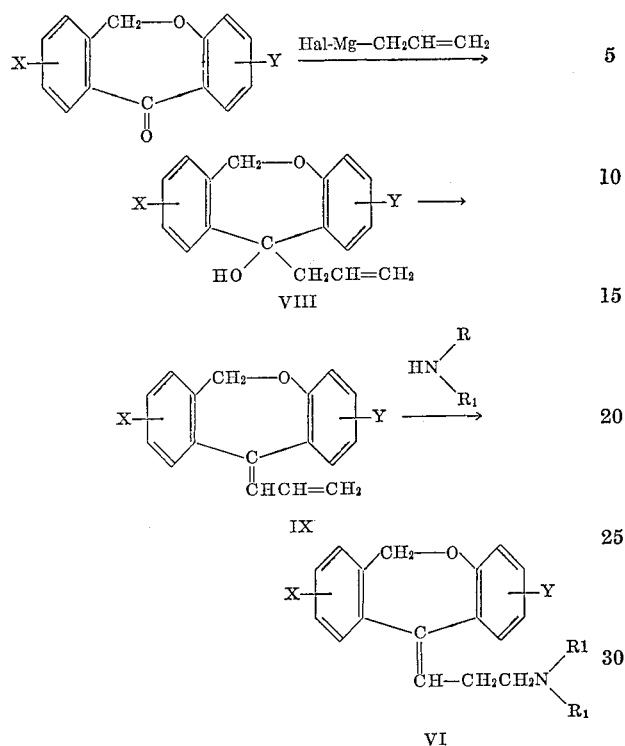

VIII

IX

VI wherein X, Y, R, $R_1$ and Hal are as hereinbefore defined.

Another alternative synthesis of the aminoalkyl compounds of the present invention involves treatment of the corresponding oxepin-11-one with a 3-dialkylaminopropyne-1 in the presence of a condensing agent such as lithium amide followed by hydrogenation and dehydration of the subsequent intermediates. These reactions are represented by the following equations:

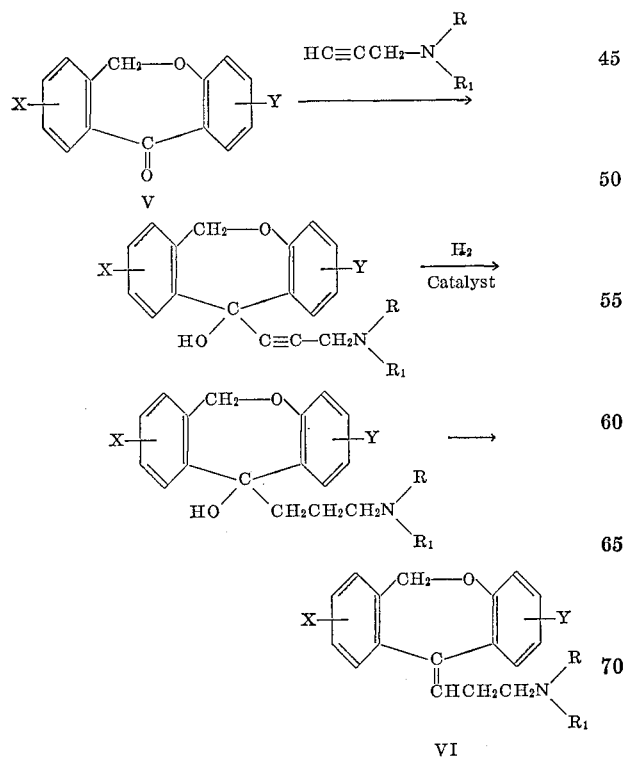

V

VI wherein X, Y, R and $R_1$ are as hereinbefore defined.

Still another alternative process for the preparation of the compounds of the present invention involves treatment of the corresponding oxepin-11-ol with acrylonitrile, followed by reduction, dehydration and alkylation of the subsequent intermediates. This reaction sequence is represented by the following equations:

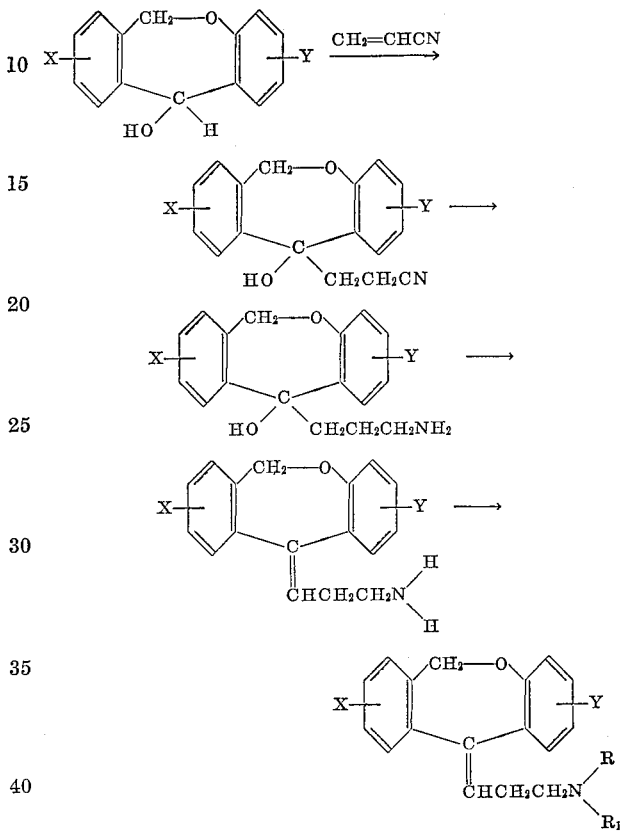

wherein X, Y, $R_1$, and R have the meanings defined hereinbefore.

An especially convenient process for the preparation of the aminoalkylidene compounds of the instant invention is the first mentioned (e.g., the reaction of the dibenz-[b,e]-oxepin-11-one with a 3-alkylaminopropyl Gignard reagent followed by the dehydration of the 11-hydroxy compound (VII) formed thereby). Thus the Grignard reagent is prepared by adding a solution of freshly distilled 3-aminopropyl halide in about 20 volumes of dry ethyl ether to an equimolar amount of magnesium turnings in the presence of a small crystal of iodine and a few drops of methyl iodide. The reaction is started by gently heating the reaction vessel to about 30 degrees C. and the addition of the alkyl halide is maintained at such a rate that the reaction solvent refluxes from the heat of the exothermic reaction. After substantially all of the magnesium metal is consumed (this requires from about 2 to about 10 hours) a solution of the appropriate oxepin-11-one in about 10 volumes of ether is added. It is preferred to employ an amount such that the mole ratio of Grignard reagent to oxepin-11-one is about 2.0 and to add the solution of the oxepin-11-one to the solution of the Grignard reagent maintained at refluxing temperature; the time of said addition generally is of the order of about one to about four hours. After the addition is complete the reaction mixture is refluxed for an additional period of about 12 to about 48 hours whereupon it is cooled and treated with an equal volume of a 10 percent aqueous solution of ammonium chloride. The intermediate 11 - (3 - aminopropyl) - 6,11 - dihydrodibenz - [b,e,]-oxepin-11-ol can be isolated in the following manner: the ethereal layer is separated, is washed with an equal volume of water, is dried with 10 percent of anhydrous sodium sulfate and the ether is evaporated. The solid residue can be further purified by recrystallization from ethanol or methanol or mixtures of ethanol and water. Dehydration of this intermediate can be accomplished by heating in the presence of an acid. Thus, the 11-hydroxy compound (VII) can be treated with about 25 volumes of 1 N aqueous hydrochloric acid and the solution heated at from about 50 to about 110 degrees C. for from about 30 minutes to about 4 hours. The mixture can be cooled and rendered strongly basic (pH 10 or above) and the liberated base (VI) is isolated by extraction into ether followed by separation of the ethereal layer and evaporation of the solvent therefrom. The 11-(3-aminopropylidene)-6,11ldihydrodibenz-[b,e]-oxepine can be further purified by distillation under reduced pressures corresponding to about 1.0 mm. of Hg.

Of course, as is obvious to those skilled in the art, when the acyl and dialkylsulfonamido-substituted dibenz-oxepin-11-ones of this invention are treated with Grignard reagents, there is a tendency for the reaction to occur with the substituent rather than, as desired, at the 11-one function. To avoid this, the acyl group may be protected during the reaction by formation of a ketal or thioketal, and it is preferred to introduce the aminoalkylidine group into the alkylsulfonamidodibenzoxepin-11-one compounds by the allylmagnesium halide route mentioned hereinabove and exemplified in detail hereinafter.

It is to be understood that processes for the preparation of the subject compounds involving treatment of groups "convertible" to new groups are contemplated by the present invention. This is particularly illustrated by the reactions represented in the following equations:

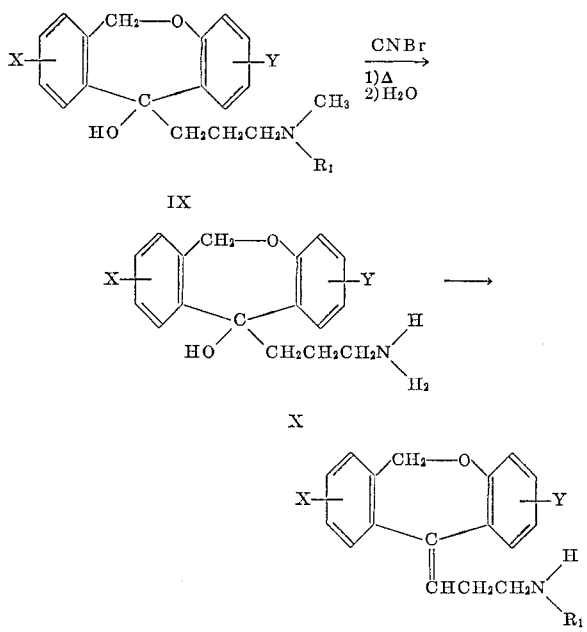

wherein X, Y, and $R_1$ are as hereinbefore defined. Since the reaction of the dibenz-oxepine-11-ones of this invention with Grignard reagents in which R as hereinbefore defined is H have a tendency to proceed in low yield, it is especially preferred to use this alternative and particularly convenient route to compounds of the instant invention in which the amino nitrogen bears a hydrogen atom. This reaction can be carried out by treating a solution of the methylalkylamino compound (IX) in about 10 volumes of benzene with about a 1.5 molar ratio of cyanogen bromide in about 10 volumes of benzene. The addition to the vigorously stirred reaction mixture is carried out over a period of about 1 to about 5 hours, then the reaction mixture is washed with a 5 percent aqueous solution of hydrochloric acid and the organic layer is separated. The intermediate cyanoamine is recovered by evaporation of the benzene solvent and is converted to the alkylamino derivative (X) by refluxing for about 60 hours with about a 30 mol ratio of sodium hydroxide in an 8 percent solution of sodium hydroxide in ethanol-water (1:2). The base (X) is recovered from the reaction mixture by extraction with benzene and is isolated by evaporation of the solvent. It is converted to the monoalkylaminopropylidene derivative (XI) by treatment with 1 N aqueous hydrochloric acid in a manner analogous to that described in the general procedure hereinabove.

Of course, other dialkylation means known to the art may be employed instead of cyanogen bromide to prepare the monoalkylamino alkyl compounds from the corresponding dialkylamino compounds. Among these are the use of chloroformates or of oxidative methods such as those involving ferricyanide.

The acid addition salts of the compounds of the present invention can be formed by treating solutions of the free bases with the desired acid. It is particularly convenient to use diethyl ether and acetone solutions of said bases and to employ aqueous solutions of said acids.

The acids which can be used to prepare the acid addition salts are preferably those which produce when combined with the free base, salts whose anions are relatively innocuous to the animal organism in therapeutic doses of the salts, so that beneficial physiological properties inherent in the free base are not vitiated by side effects ascribable to the anions. However, when the products are the salts of toxic acids, they are readily converted to the free base by treatment with a strong base such as dilute sodium hydroxide.

Appropriate non-toxic acid addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, maleic acid, and the like, giving the hydrochloride, hydrobromide, hydroiodide, nitrate, phosphate or acid phosphate, sulfate or bisulfate, acetate, citrate or acid citrate, tartrate or bitartrate, and maleate salts, respectively.

The preferred new psychotherapeutic agents of the present invention possess high activity in the treatment of mental depression. The physician will indicate daily dosage of said preferred compounds of this invention. The dosage will be dependent upon the extent of mental depression, whether mild or severe. Tablets or capsules containing 10, 25, 50 and 150 milligrams of instant therapeutic agents are convenient unit dosage forms. Such tablets or capsules may be prepared from mixtures of the present compounds with well known pharmaceutical excipients, such as starch, sugar, tapioca, certain forms of clay and the like. Alternatively, liquid preparations may be prepared from mixtures of the present therapeutic agents and pharmaceutically-acceptable liquid media, such as water, aqueous glycols, sugar solutions, and the like which may contain conventional flavoring and coloring agents. Since the aforesaid pharmaceutically acceptable acid-addition salts of the compounds of instant invention are relatively much more soluble than the free bases, advantage is taken of this in the isolation and/or purification of the above compounds and in the preparation of aqueous solutions of these new compounds for oral or parenteral administration.

With respect to the synthesis of the dibenzoxepinones of this invention wherein a trifluoromethyl group is substituted therein, it has been found that low yields of starting materials are obtained if the reaction sequence outlined hereinbefore is employed. While the reason for this is not clearly understood at this time, it is believed that the low yields are due to a complicated polymerization reaction involving the trifluoromethyl phenol starting material (Compound II, Y=4-$CF_3$). Accordingly, as will be exemplified hereinafter, an alternative method for the preparation of trifluoromethyl-substituted dibenz-[b,e]-oxepines has been developed. This involves, for example, reaction of readily available 2-bromobenzyl alcohol with 2-nitro-4-trifluoromethylchlorobenzene in the presence of about 1 molar equivalent of sodium hydride in about 10 volumes of dimethylformamide at 70° C. for about 10 to about 20 hours whereby 2-(2′-nitro-4′-trifluoromethylphenoxymethyl)bromobenzene is formed. This intermediate is treated with iron and acetic acid whereby the nitro group is reduced to an amino group and then the amino group is diazotized and the diazo group is replaced with hydrogen by reaction with, for example, hypophosphorus acid or sodium borohydride according to procedures well known in the art. The 2(4′-trifluoromethylphenoxymethyl)bromobenzene is next reacted with magnesium and then with carbon dioxide in the manner well known in the art whereby the bromo group is replaced by a carboxyl group and the compound representd by formula IV (X=H, Y=4-CF$_3$) is obtained. This is cyclized in the manner hereinbefore described to obtain 2-trifluoromethyl-6,11-dihydrodibenz-[b,e]-oxepin-11-one.

It is, of course, to be understood that the instant invention contemplates compounds of the type capable of existing as cis and trans isomers. For example, the dialkylaminopropylidene-oxepines can exist as isomers. While the isomeric mixtures exhibit therapeutic properties of the type possessed by these novel compounds, in some instances the activity may be greater in one pure isomer than in the other.

With reference to the cis and trans isomers of 11-(3-dimethylaminopropylidene) - 6,11 - dihydrodibenz-[b,e]-oxepine, there are found to be substantial differences in the pharmacological activity of these two materials. Thus, one of the pure isomers is much more effective in potentiating the stimulant effect of d-amphetamine and in its central nervous system activity, as measured by loss of avoidance behavior and by other tests. Furthermore, this same isomer is distinctly more potent as a spasmolytic agent against several spasmogens.

Since it has not been possible up to this time rigously to establish the absolute configurations of the isolated pure isomers, they will be described hereinafter and in the appended claims in terms of their physical constants.

Separation of isomeric 11 - (3 - dimethylaminopropylidene)-6,11-dihydrodibenz-[b,e]-oxepine, prepared by the carbinol dehydration process disclosed hereinbefore and exemplified hereinafter, may be carried out in several ways. Thus, for example, subjecting the mixed isomers to thin layer chromatography, according to the method of Brenner and Niederwieser in volume 17, Experentia, page 237, No. 5, (1961), with continuous elution for 10 hours with 10% diethylaminehexane over silica gel on glass plates causes separation of two substances with R$_f$ values of 0.45 and 0.50, respectively. Location of the spots is facilitated by spraying the developed plates with concentrated sulfuric acid, by treating them at 100° C. for several minutes and thereafter examining them under ultraviolet light. This technique, in addition to indicating the presence of the two isomers, also shows that one is much more abundant than the other in mixtures prepared by dehydration of the corresponding 11-carbinol.

With respect to the relative abundance of the two isomers, nuclear magnetic resonance spectra (NMR) were obtained for the hydrochlorides of the synthesis mixture, for the individual pure isomers and for 90–10 and 80–20 mixtures of the two pure isomers. The data obtained, under parallel NMR conditions, indicated that the relative amount of the more active isomer, which forms a hydrochloride with M.P., 209–210.5° C., is 18± 3%. The balance of the mixture is comprised of the lesser-active isomer, which forms a hydrochloride with M.P. 192–193° C. The NMR spectrum of the higher melting isomeric hydrochloride salt measured in deuterochloroform solvent at 12.5% concentration has a vinyl proton triplet absorption of tau-4.35 (339 c.p.s. from TmSi standard at 60 mc.). The NMR spectrum of the lower melting isomeric hydrochloride salt measured in deuterochloroform solvent at 25% concentration has a vinyl proton triplet absorption at tau-4.07 (356 c.p.s. from TmSi standard at 60 mc.).

With respect to further physical distinctions between the isomers, ultraviolet spectra show extinction coefficients, at 1% concentrations in ethanol, at 296 millimicrons, of 101 and 136, respectively, for the high-melting and low-melting hydrochlorides.

In addition to the separation by thin layer chromotography, the mixture may be separated by a crystallization technique, which takes advantage of differences in solubilities of the two isomeric maleates. For example, the cis/trans mixture of 11-(3-dimethylaminopropylidine)-6,11 - dihydrodibenz-[b,e]-oxepine hydrochloride, M.P. 188–189° C., prepared by dehydration of the corresponding carbinol is converted to the free base and the free base is converted to the isomeric maleate salt, M.P. 168–169° C. This is fractionally crystallized in ethanol from which is first isolated, because of its lesser solubility, the pure maleate, M.P., 172–173° C., of the isomer which forms the hydrochloride with lower M.P., 192–193° C. This isomer is the least active pharmacologically and is the most abundant in the synthetic mixture. Recombination and concentration of the mother liquors and finally evaporation of the solvent leaves, as a residue, the pure maleate of the isomer which forms the hydrochloride melting at 209–210.5°. This isomer is the most pharmacologically active.

The least active isomer is useful as an intermediate for the preparation of the more active isomer. Thus, the isomeric hydrochloride, M.P., 192–193° C. is dissolved in about one hundred parts by weight of strong mineral acid, conveniently N hydrochloric acid, and the mixture is heated at 100° C. for from about 2 to about 10 hours. The solvent is evaporated and there remains an equilibrium mixture of cis and trans 11-(3-dimethylaminopropylidene)-6,11 - dihydrodibenz-[b,e]-oxepine hydrochloride. This is separated into its pure components by fractional crystallization as described hereinbefore and the more active isomer is readily obtained.

As an alternative to isolating the more active, least-abundant isomer from the liquors of the above-described fractional crystallization, it has also been found equally feasible to separate a cis/trans mixture of 11-(3-methylaminopropylidene) - 6,11 - dihydrodibenz-[b,e]-oxepine hydrochloride and then to methylate the isomers. Thus, as will be exemplified in detail hereinafter, the monomethyl, i.e., the nor-methyl, compounds are fractionally crystallized from alcohol, the separated isomeric hydrochlorides are converted to the free bases and the bases are treated with formic acid and formaldehyde, then with 10% sodium hydroxide and are extracted into benzene. Evaporation of the benzene leaves the desired compound as a residue, which can be converted into crystalline salts.

While the relationship of the following pharmocological data to the quantitative antidepressant activity of the compounds of this invention are not clearly understood, the data are recognized in the art to be closely related to the effects observed on administration to mentally-depressed subjects. Thus, they are able to be used to clearly establish in which isomer the major part of the pharmacological activity resides.

A recognized test for central nervous system activity is to measure the presence or absence of a potentiating effect on the stimulation induced by d-amphetamine. In this test, rats are administered d-amphetamine and periodic observations are made of their increase in motor activity such as leg movements and moving from place to place. These observation assays are scored to obtain a mean score of activity (MSA) for the subjects and the measurements over a period of time, for example, 6 hours, show a regular progression from the 0 level to about 3.5 after 1 hour to a peak of 3.9 during the second hour, then a gradual drop to 0 again from the third to the fifth hour. A drug is assayed by administration to the d-amphetamine-treated (5 mg./kg.) rat and the MSA is determined and compared against the profile obtained from the control series. Drugs which increase the MSA above the values induced by d-amphetamine alone, or which increase the duration of the active state are said to potentiate its effect on the central nervous system.

It is found that the isomer of 11-(3-dimethylaminopropylidene) - 6,11 - dihydrodibenz-[b,e] - oxepine forming a hydrochloride melting at 209–210.5° C. strongly potentiates d-amphetamine while the isomer forming a hydrochloride melting at 192–193° C. surprisingly does not. Thus the former, when administered at 20 mg./kg., causes an increase in the MSA to 4.5 after 2 hours and this is maintained until the end of the 4th hour, at which time it begins to decrease to about 0 by the end of the 6th hour. The potentiating effect is clearly as marked, although quantitatively the increase is not as great when this isomer is administered at 10 mg./kg. In sharp contrast, administration of the isomer forming the lower melting hydrochloride did not potentiate d-amphetamine. Here, treatment with 20 mg./kg. caused the MSA to decrease to about 2.5 during the 2nd through 3rd hours and then the value declined to 0 during the final hours. The same general behavior was observed after administration of 10 mg./kg.

Differences between the two isomeric forms are also found in measurements of their ability to influence the loss of avoidance behavior. In this test, rats which are trained on a Sidman non-discriminated avoidance schedule to perform acts which avoid shocks are treated with the drug to be evaluated and are closely observed to determine its effect, if any, on their avoidance behavior. It is found that the isomer which forms the higher melting hydrochloride, when administered at a rate of 30 mg./kg. shows a marked increase in its effect on avoidance behavior when compared against the isomer forming the lower-melting hydrochloride. Thus, the mean shocks per minute value observed in the 20–40 minute period after administration of the former is about 1.75, while for the latter isomer the corresponding value is about 1.35 and for the rats administered saline only the value is 0.

With respect to spasmolytic activity on the isomers, the data are summarized as follows:

| Spasmogen | 11-(3-dimethylaminopropylidene)-6, 11-dihydrodibenz [b,e]-oxepine | |
|---|---|---|
| | Isomer HCl, M.P. 192–193° C., $EC_{50}$* | Isomer HCl, M.P. 209–210.5° C., $EC_{50}$ |
| Serotonin, mg./cc | 0.13 | 0.019 |
| Acetylcholine, mg./cc | 0.45 | 0.15 |
| Histamine, mg./cc | 0.004 | 0.001 |
| Angiotensin, mg./cc | 2.5 | 0.23 |
| Barium, mg./cc | 2.3 | 2.9 |

*$EC_{50}$—Concentration effective to induce significant change in 50% of the samples.

This well-known test measures the ability of the isomers to counteract the in vitro effect of the listed spasmogens on isolated guinea pig ileum. These data show that the isomer with the hydrochloride of higher melting point is a distinctly more potent spasmolytic agent.

The following examples are given by way of illustration and are not to be construed as limitations of this invention, many variations of which are possible within the scope and spirit thereof.

EXAMPLE I 2-phenoxymethylbenzoic acid.—Phenol (7.05 g.) is dissolved in a solution of 3.0 g. of sodium hydroxide in 50 ml. of water and 17.5 g. of ethyl 2-bromomethylbenzoate is added. The reaction mixture is stirred vigorously at 100° in a nitrogen atmosphere for 5 hours, and then the organic product is extracted into 3–25 ml. portions of benzene. The combined benzene extracts are washed successively with 10 percent aqueous sodium carbonate solution (50 ml.) and with 50 ml. of saturated aqueous sodium chloride solution and the benzene solvent is evaporated. The crude residue (15.0 g.) is distilled in a vacuum and the intermediate, ethyl 2-phenoxymethyl benzoate, is collected at 130–140 degrees C. (0.45 mm. Hg). It is a colorless oily liquid which weighs 10.22 g. The intermediate ester is hydrolyzed to the corresponding acid by refluxing a suspension of 10 g. of the ester in 100 ml. of 10 percent aqueous sodium hydroxide solution to which 50 ml. of ethanol had been added. After 65 hours of refluxing, the reaction mixture is extracted with two 50 ml. portions of benzene, and after separation of the benzene, the aqueous layer is rendered acidic to pH 1 with 10 percent aqueous hydrochloric acid. The product is extracted from the acidic layer with three 50 ml. portions of benzene, the benzene extracts are washed with two 50 ml. portions of water then dried with 5 wt. percent of anhydrous sodium sulfate and the benzene is evaporated. There is obtained 8.9 g. of 2-phenoxymethylbenzoic acid, M.P., 118–122 degrees C. A more highly purified material, M.P., 125.5–126.5 degrees C., is obtained after recrystallization from ethanol.

EXAMPLE II

The reaction sequence outlined in Example I is carried out with the appropriately substituted ethyl 2-bromoethylbenzoates and phenols in place of the unsubstituted compounds at identical mole ratios and the following additional 2-phenoxymethylbenzoic acids are obtained.

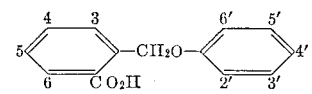

5-chloro-2-phenoxymethylbenzoic acid
5-chloro-2-(4'-chlorophenoxymethyl)benzoic acid
2-(4'-chlorophenoxymethyl)benzoic acid
3-methyl-2-phenoxymethylbenzoic acid
3-methyl-2-(4'-chlorophenoxymethyl)benzoic acid
5-methyl-2-phenoxymethylbenzoic acid
2-(4'-methylphenoxymethyl)benzoic acid
5-methoxy-2-phenoxymethylbenzoic acid
2-(4'-methoxyphenoxymethyl)benzoic acid
4-propyl-2-phenoxymethylbenzoic acid
2-(5'-methylthiophenoxymethyl)benzoic acid
4-methylthio-2-phenoxymethylbenzoic acid
5-trifluoromethyl-2-phenoxymethylbenzoic acid
6-methyl-2-(3'-methylphenoxymethyl)benzoic acid
2-(6'-chlorophenoxymethyl)benzoic acid
5-fluoro-2-phenoxymethylbenzoic acid
2-(4'-fluorophenoxymethyl)benzoic acid
2-phenoxymethyl-4-propylthiobenzoic acid
2-phenoxymethyl-4-i-propoxybenzoic acid
2-(4'-acetylphenoxymethyl)benzoic acid
2 - (4' - (1'',1''-dimethylacetyl)phenoxymethyl)benzoic acid
2-(4'-dimethysulfonamidophenoxymethyl)benzoic acid
2 - (4' - di-i-propylsulfonamidophenoxymethyl)benzoic acid

EXAMPLE III 6,11-dihydrodibenz[b,e]-oxepin-11-one.—To 60 ml. of trifluoroacetic anhydride is added 15 g. (0.066 mol) of 2-phenoxymethylbenzoic acid prepared as described in Example I. The addition is carried out portionwise at 25 degrees C. over 30 minutes. The reaction mixture is stirred for an additional four hours then it is poured into 300 ml. of water. The suspension is rendered basic to pH 12 by the addition of 25 percent aqueous sodium hydroxide solution and the organic layer is extracted with four 50 ml. portions of benzene. The combined benzene extracts are washed with two 50 ml. portions of water and then dried with 5 wt.-percent of anhydrous sodium sulfate. After evaporation of the benzene solvent there is obtained 10.5 g. of product, M.P. 67–70 degrees C. The 6,11-dihydrodibenz- [b,e]-oxepin-11 is purified by recrystallization from hexane. The purified product melts at 70.5–71.5 degrees C.

EXAMPLE IV

The procedure of Example III is used to prepare the following additional substituted dibenz- [b,e]-oxepin-11-ones from the appropriate acids of Examples I and II.

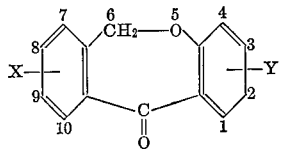

| X | Y |
| --- | --- |
| 9-Cl | H |
| 9-Cl | 2-Cl |
| H | 2-Cl |
| 7-CH$_3$ | H |
| 7-CH$_3$ | 2-Cl |
| 9-CH$_3$ | H |
| H | 2-CH$_3$ |
| 9-CH$_3$O | H |
| H | 2-CH$_3$O |
| 8-CH$_3$CH$_2$CH$_2$ | H |
| H | 3-CH$_3$S |
| 8-CH$_3$S | H |
| 9-CF$_3$ | H |
| H | 2-CF$_3$ |
| 10-CH$_3$ | 1-CH$_3$ |
| H | 4-Cl |
| 9-F | H |
| H | 2-F |
| 8-CH$_3$CH$_2$CH$_2$S | H |
| 8-(CH$_3$)$_2$CHO | H |
| H | 2-CH$_3$CO |
| H | 2-(CH$_3$)$_2$CHCO |
| H | 2-(CH$_3$)$_2$NSO$_2$ |
| H | 2-[(CH$_3$)$_2$CH]$_2$NSO$_2$ |

EXAMPLE V

11 - (3-dimethylaminopropyl) - 6,11 - dihydrodibenz-[b,e]-oxepin-11-ol.—Freshly distilled 3-dimethylaminopropyl chloride (11.5 g., 0.095 mol) in 200 ml. of dry ether is added slowly with stirring and gentle heating to 2.28 g. (0.095 mol) of magnesium turnings, a crystal of iodine and a few drops of methyl iodide. After all of the alkyl halide has been added the suspension is refluxed for two hours and there is added to the refluxing solution of Grignard reagent a 10 percent by weight ethereal solution of 10.0 g. (0.0475 mol) of 6,11-dihydrodibenz-[b,e]-oxepin-11-one prepared as in Example III. The addition is made during 1.5 hours after which the reaction mixture is refluxed for an additional 20 hours, then is cooled and treated successively with 200 ml. of a 10 percent aqueous ammonium chloride solution and 100 ml. of ice water. The organic layer is separated, is washed with two 100 ml. portions of water, is dried with 5 percent by weight of anhydrous sodium sulfate and the solvent is evaporated. The residue is triturated with hexane and separated; 10.0 g. of 11-(3-dimethylaminopropyl)-6,11-dihydrodibenz- [b,e]-oxepin-11-ol, M.P. 119–121 degrees C., is obtained. Recrystallization from ethanol-water affords a more pure product, M.P. 121–123 degrees C. Paper chromatographic analysis indicates the sample to be homogeneous.

*Analysis.*—Calcd. for $C_{19}H_{23}O_2N$: C, 76.73; H, 7.80; N, 4.71. Found: C, 76.86; H, 7.89; N, 4.73.

By the same procedure, after substitution of the appropriate alkylaminoalkyl chloride for the corresponding 3-dimethylaminopropyl chloride, there are obtained the following dibenzoxepines:
11 - (3-ethylmethylaminopropyl)-6 - 11 - dihydrodibenz-[b,e]-oxepin-11-ol.
11 - (3 - allylmethylaminopropyl) - 6,11 - dihydrodibenz-[b,e]-oxepin-11-ol
11 - (3 - cyclopropylmethylmethylaminopropyl) - 6,11-dihydrodibenz-[b,e]-oxepin-11-ol
11 - (3 - cyclopropylmethylaminopropyl) - 6,11 - dihydrobenz-[b,e]-oxepin-11-ol

EXAMPLE VI

11 - (3 - dimethylaminopropylidene) - 6,11 - dihydrodibenz-[b,e]-oxepin.—A suspension of 4.1 g. of 11-(3-dimethylaminopropyl) - 6,11 - dihydrodibenz-[b,e]-oxepin-11-ol in 100 ml. of 1 N hydrochloric acid is heated at 100 degrees C. for 2 hours. The reaction mixture is then made basic to pH 11 by addition of 20 percent aqueous sodium hydroxide solution and the liberated product is extracted into 100 ml. of ether, the ether is washed with two 50 ml. portions of water, is dried with 5 wt. percent of anhydrous sodium sulfate and the ether is evaporated in a vacuum of 15 mm. Hg. Distillation of the residue gives 11-(3-dimethylaminopropylidene) - 6,11 - dihydrodibenz - [b,e]-oxepin, 3.08 g., B.P. 260–270 degrees C. at 0.2 mm. Hg.

*Analysis.*—Calcd. for $C_{19}H_{21}ON$: C, 81.68; H, 7.58. Found: C, 81.45; H, 7.67.

By the same procedure, 11-(3-ethylmethylaminopropylidene) - 6,11 - dihydrodibenz-[b,e]-oxepine, 11 - (3-allylmethylaminopropylidene) - 6,11 - dihydrodibenz - [b,e]-oxepine, 11 - (3 - cyclopropylmethylmethylaminopropylidene) - 6,11 - dihydrodibenz-[b,e]-oxepine and 11 - (3-cyclopropylmethylaminopropylidene) - 6,11 - dihydrodibenz-[b,e]-oxepine are obtained by dehydration of the corresponding 11-ol compounds of Example V.

EXAMPLE VII

11 - (3 - methylaminopropylidene) - 6,11 - dihydrodibenz-[b,e]-oxepine.—The 11 - (3 - dimethylaminopropyl)-6,11 - dihydrodibenz-[b,e]-oxepin - 11 - ol of Example V (10.4 g., 0.033 mol) dissolved in 125 ml. of benzene is added dropwise, with stirring, to 6.0 of cyanogen bromide in 50 ml. of benzene over a 3 hour period. After an additional 30 minutes the solvent is removed by distillation at a pressure of 15 mm. Hg, and the residue is redissolved in 50 ml. of benzene. The solution is washed successively with 50 ml. of water. The benzene solution is dried with 5 percent by weight of anhydrous sodium sulfate, and the benzene is distilled off at a pressure of 15 mm. Hg. The crude cyanomine residue is hydrolyzed by refluxing a mixture in 150 ml. of 10 percent aqueous sodium hydroxide and 75 ml. of ethanol for 44 hours in a nitrogen atmosphere. The reaction mixture is acidified to pH 1 with N hydrochloric acid while at 90 degrees C., is cooled to 25 degrees C. and is extracted with three 25 ml. portions of benzene. The aqueous phase after separation of the benzene is made strongly basic (pH 12) by addition of 20 percent aqueous sodium hydroxide, and the liberated product is extracted into three 25 ml. portions of benzene. Evaporation of the benzene solvent at 20 mm. Hg leaves the 11-(3 - methylaminopropylidene)-6,11-dihydrodibenz-[b,e]-oxepine. This is converted to a crystalline hydrochloride by treating a solution of the product in 30 ml. of ether with a saturated ethanolic solution of hydrogen chloride and evaporating the solvents. The hydrochloride is further purified by recrystallization from isopropanol. The product melts at 241–242° C.

*Analysis.*—Calcd. for $C_{18}H_{19}NO \cdot HCl$: C, 71.63; H, 6.68; N, 4.64. Found: C, 71.37; H, 6.64; N, 4.38.

EXAMPLE VIII

Following the procedure of Example V with substitution for the corresponding unsubstituted oxepin-11-one the dibenzoxepin-11-ones of Example IV, and using the appropriate 3-aminopropyl chloride, the following additional 11 - (3 - aminopropyl) - 6,11 - dihydrodibenz - [b,e]-oxepin-11-ols are formed:

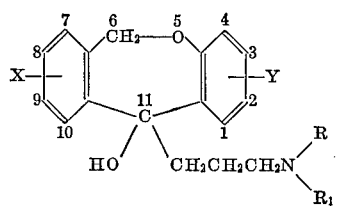

| X | Y | R | $R_1$ |
|---|---|---|---|
| 9-Cl | H | $CH_3$ | $CH_3$ |
| 9-Cl | 2-Cl | $CH_3$ | $CH_3$ |
| H | 2-Cl | $CH_3$ | $CH_3$ |
| H | 2-Cl | $CH_3$ | $CH_2CH=CH_2$ |
| H | 2-Cl | $CH_3$ | $\overline{CH_2CHCH_2CH_2}$ |
| H | 2-Cl | $CH_3$ | $\overline{CHCH_2CH_2}$ |
| 7-$CH_3$ | H | $CH_3$ | $CH_3$ |
| 7-$CH_3$ | 2-Cl | $CH_3$ | $CH_3$ |
| 9-$CH_3$ | H | $CH_3$ | $CH_3$ |
| H | 2-$CH_3$ | $CH_3$ | $CH_3$ |
| 9-$CH_3O$ | H | $CH_3$ | $CH_3$ |
| H | 2-$CH_3O$ | $CH_3$ | $CH_3$ |
| 8-$CH_3CH_2CH_2$ | H | $CH_3$ | $CH_3$ |
| H | 3-$CH_3S$ | $CH_3$ | $CH_3$ |
| 8-$CH_3S$ | H | $CH_3$ | $CH(CH_3)_2$ |
| 9-$CF_3$ | H | $CH_3$ | $CH_3$ |
| H | 2-$CF_3$ | $CH_3$ | $CH_3$ |
| 10-$CH_3$ | 1-$CH_3$ | $CH_3$ | $CH_2CH_3$ |
| H | 4-Cl | $CH_3$ | $CH_2CH_2CH_3$ |
| 9-F | H | $CH_3$ | $CH_3$ |
| H | 2-F | $CH_3$ | $CH_3$ |
| 8-$CH_3CH_2CH_2S$ | H | $CH_3$ | $CH_3$ |
| 8-$(CH_3)_2CHO$ | H | $CH_3$ | $CH_3$ |
| H | 2-$CH_3CO$ | $CH_3$ | $CH_3$ |
| H | 2-$(CH_3)_2CHCO$ | $CH_3$ | $CH_3$ |
| H | 2$(CH_3)_2NSO_2$ | $CH_3$ | $CH_3$ |
| H | 2[$(CH_3)_2CH_2$]$NSO_2$ | $CH_3$ | $CH_3$ |

EXAMPLE IX

Following the procedure of Example VII and substituting the appropriate dialkylaminopropylidene-oxepinols of Example VIII, the following additional monoalkyl-aminopropylidene-dibenzoxepin-11-ols are prepared:

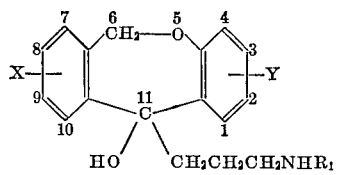

| X | Y | $R_1$ |
|---|---|---|
| 9-Cl | H | $CH_3$ |
| H | 2-Cl | $CH_3$ |
| 9-$CH_3O$ | H | $CH_3$ |
| 9-$CF_3$ | H | $CH_3$ |
| 10-$CH_3$ | 1-$CH_3$ | $CH_2CH_3$ |
| H | 2-$CH_3CO$ | $CH_3$ |
| H | 2-Cl | $\overline{CHCH_2CH_2}$ |

EXAMPLE X

The oxepin-11-ols of Examples VIII and IX are dehydrated by the procedure of Example VI and the following additional substituted 11-(3-aminopropylidene)-6,11-dihydrodibenz-[b,e]-oxepines are obtained:

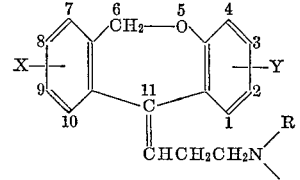

| X | Y | R | $R_1$ |
|---|---|---|---|
| 9-Cl | H | $CH_3$ | $CH_3$ |
| 9-Cl | H | H | $CH_3$ |
| 9-Cl | 2-Cl | $CH_3$ | $CH_3$ |
| H | 2-Cl | $CH_3$ | $CH_3$ |
| H | 2-Cl | H | $CH_3$ |
| H | 2-Cl | $CH_3$ | $CH_2CH=CH_2$ |
| H | 2-Cl | $CH_3$ | $\overline{CH_2CHCH_2CH_2}$ |
| H | 2-Cl | H | $\overline{CHCH_2CH_2}$ |
| H | 2-Cl | $CH_3$ | $\overline{CHCH_2CH_2}$ |
| 7-$CH_3$ | H | $CH_3$ | $CH_3$ |
| 7-$CH_3$ | 2-Cl | $CH_3$ | $CH_3$ |
| 9-$CH_3$ | H | $CH_3$ | $CH_3$ |
| H | 2-$CH_3$ | $CH_3$ | $CH_3$ |
| 9-$CH_3O$ | H | $CH_3$ | $CH_3$ |
| 9-$CH_3O$ | H | H | $CH_3$ |
| H | 2-$CH_3O$ | $CH_3$ | $CH_3$ |
| 8-$CH_3CH_3CH$ | H | $CH_3$ | $CH_3$ |
| H | 3-$CH_3S$ | $CH_3$ | $CH_3$ |
| 8-$CH_3S$ | H | $CH_3$ | $CH(CH_3)_2$ |
| 9-$CF_3$ | H | $CH_3$ | $CH_3$ |
| 9-$CF_3$ | H | H | $CH_3$ |
| H | 2-$CF_3$ | $CH_3$ | $CH_3$ |
| 10-$CH_3$ | 1-$CH_3$ | $CH_3$ | $CH_2CH_2$ |
| 10-$CH_3$ | 1-$CH_3$ | H | $CH_2CH_2$ |
| H | 4-Cl | $CH_3$ | $CH_2CH_2CH_3$ |
| 9-F | H | $CH_3$ | $CH_3$ |
| H | 2-F | $CH_3$ | $CH_3$ |
| 8-$CH_3CH_2CH_2S$ | H | $CH_3$ | $CH_3$ |
| 8-$(CH_3)_2CHO$ | H | $CH_3$ | $CH_3$ |
| H | 2-$CH_3CO$ | $CH_3$ | $CH_3$ |
| H | 2-$CH_3CO$ | H | $CH_3$ |
| H | 2-$(CH_3)_2CHCO$ | $CH_3$ | $CH_3$ |
| H | 2$(CH_3)_2NSO_2$ | $CH_3$ | $CH_3$ |
| H | 2$(CH_3)_2CH_2NSO_2$ | $CH_3$ | $CH_3$ |

EXAMPLE XI

2 - dimethylsulfonamido - 11 - (3 - monomethylaminopropylidene) - 6,11 - dihydrodibenz - [b,e] - oxepine.— 6,11-dihydrodibenz-[b,e]-oxepin-11-one, 20 g., prepared as described in Example III is suspended in 30 ml. of sulfuryl chloride. The reaction mixture is maintained at 25° C. for ½ hour then is warmed to 80° for 1 hour. The mixture then is poured into ice water and the sulfonyl chloride intermediate which precipitates is collected by filtration. Five grams of the sulfonyl chloride compound is treated with 20 ml. of anhydrous dimethylamine and, after the mixture is allowed to stand at 25° C. for 16 hours, the excess dimethylamine is distilled off. The 2-dimethylsulfonamido-6,11-dibenz-[b,e]-oxepin-11-one which remains as a residue from the distillation is recrystallized from ethanol. Seven grams of the sulfonamido oxepin-11-one is suspended in 50 ml. of diethyl ether and a 0.6 molar solution of allyl magnesium bromide in diethyl ether is added thereto during 1½ hours at 25° C. The suspension is heated to refluxing temperature for an additional ¾ hour, then is cooled at 25° C. and is treated with 100 ml. of a 10% aqueous ammonium chloride solution. The ether layer is separated and combined with 50 ml. of an ethereal extract of the aqueous layer. The combined ether layers are dried with 10 wt. percent of anhydrous sodium sulfate, the drying agent is filtered off and the ether is removed by distillation. The product, 11-allyl-6,11-dihydrodibenz-[b,e]-oxepin-11-ol, remains as a pale yellow oil. Seven and seven-tenths grams of the 11-ol and 10 g. of triethylamine are dissolved in 140 ml. of diethyl ether and the resulting solution is cooled to −10° C., then is treated with a cold solution of 3.57 g. of thionyl chloride in 50 ml. of ether. After two hours, the reaction mixture is poured into ice-water (150 ml.), the cold ether layer is separated, washed with 50 ml. of 10% aqueous sodium carbonate solution at 5° C., dried with 5 wt. percent anhydrous sodium sulfate, the sodium sulfate is separated by filtration and the ether is removed by distillation under vacuum at −5° C. until the volume of solution is 30 ml. The solution of diene in ether is transferred to a pressure bottle, 20 ml. of anhydrous monomethylamine is added and the vessel is sealed and allowed to stand at 25° C. for 48 hours. The bottle is then cooled to −15° C., is opened and then the excess amine is allowed to evaporate at room temperature. The residue is dissolved in 25 ml. of ether, the organic layer is extracted with 50 ml. of 1 N aqueous HCl and the free base is liberated by the addition of concentrated aqueous ammonia to pH 10. The free base is extracted into 50 ml. of diethyl ether, the ether extract is washed with three 25 ml. portions of water, is dried with 5 wt. percent of anhydrous sodium sulfate and the ether is removed by distillation. The product, 2 - dimethylsulfonamido - 11 - (3-monomethylaminopropylidene) - 6,11 - dihydrodibenz-[b,e]-oxepine, is dissolved in 20 ml. of ether and is treated with a molecular equivalent of hydrogen chloride dissolved in ether. The solvents are evaporated and the residue is recrystallized from isopropanol to obtain the hydrochloride, M.P. 199–201° C.

Analysis.—Calcd. for $C_{20}H_{24}O_3N_2S \cdot HCl$: C, 58.73; H, 6.17; N, 6.85. Found: C, 59.04; H, 6.22; N, 6.54.

EXAMPLE XII

The hydrochloric acid addition salt of 11-(3-dimethylaminopropylidene) - 6,11 - dihydrodibenz-[b,e]-oxepine is prepared by mixing an acetone solution of the free base with an aqueous solution of hydrochloric acid and evaporating the resultant solution.

Other acid addition salts of the new oxepine compounds of the present invention described in the above examples are prepared by this same procedure employing acetic acid, hydrobromic acid, hydriodic acid, nitric acid, citric acid, phosphoric acid, tartaric acid, sulfuric acid, lactic acid and maleic acid.

EXAMPLE XIII 2-trifluoromethyl - 6,11-dihydrodibenz-[b,e]-oxepin-11-one.—2-bromobenzyl alcohol (0.1 mole) is dissolved in 50 ml. of dry dimethylformamide and is treated with 0.1 mole of sodium hydride dissolved in 100 ml. of dimethylformamide. The mixture is treated with 2-nitro-4-trifluoromethylchlorobenzene (0.1 mole) and is heated to 70° C. for 15 hours. The reaction mixture is cooled and then poured into 500 ml. of water. The 2-(2′-nitro-4′-trifluoromethylphenoxymethyl)bromobenzene which separates is collected by extraction into three 100 ml. portions of benzene and, after removal of the solvent by distillation in vacuo, the product is purified by recrystallizing from equal parts of benzene and hexane; M.P. 108.5–109.5° C.

Analysis.—Calcd. for $C_{14}H_9O_3NBrF_3$: C, 44.7; H, 2.4; N, 3.8. Found: C, 44.7; H, 2.4; N, 3.7.

2 - (2′ - nitro-4′-trifluoromethylphenoxymethyl)bromobenzene (0.18 mole) is heated in a refluxing suspension of 120 g. of iron filings and 350 ml. of water. To the stirred reaction mixture is added 240 ml. of glacial acetic acid over a period of 3 hours; after an additional 2 hours, the reaction mixture is cooled, 300 ml. of benzene is added, and the solids are removed and washed with an additional 100 ml. of benzene. The organic layer containing the product is separated. washed with water, dried with anhydrous sodium sulfate (10 wt. percent), and the solvent is removed in vacuo. The residue is purified by distillation at a pressure of about 1 mm. Hg.

2-(2′-amino-4′ - trifluoromethylphenoxymethyl)bromobenzene (0.05 mole) is dissolved in 50 ml. of water containing 0.22 equivalents of sulfuric acid. The solution is cooled to 0–5° C. and is treated with a cold solution of 0.055 mole of sodium nitrite in 15 ml. of water. After 30 minutes, there is added 0.055 equivalents of hypophosphorous acid and the suspension is warmed to 35° C. for 1 hour and then is treated with 200 ml. of water and the product is recovered by extraction into three 75 ml. portions of benzene. The solvent is removed by distillation in vacuo. The product, 2-(4′-trifluoromethylphenoxymethyl)bromobenzene is purified by distillation at a pressure of about 1 mm. Hg.

2 - (4′ - trifluoromethylphenoxymethyl)bromobenzene (0.03 mole) dissolved in 75 ml. of anhydrous diethyl ether is added slowly in a nitrogen atmosphere to magnesium turnings (0.033 mol) and a crystal of iodine. After the heat of reaction subsides, the mixture is refluxed for two hours, then is cooled to 25° C. and saturated with gaseous carbon dioxide. The gas flow is continued for 12 hours then is stopped and the suspension is poured into a mixture of 100 ml. of 1 N aqueous hydrochloric acid and 100 g. of ice. The mixture is stirred at room temperature until the ice has melted, then the carboxylic acid fraction is isolated and the aqueous layer is washed with two 25 ml. portions of ether. The ether extracts are combined with the carboxylic acid fraction and the ether is distilled off leaving the product 2-(4′-trifluoromethylphenoxymethyl)benzoic acid. This is purified by recrystallization from dilute ethanol and is converted by the procedure described in Example III to form the 2 - trifluoromethyl - 6,11-dihydrodibenz-[b,e]-oxepin-11-one of Example IV.

EXAMPLE XIV

Separation of isomeric 11-(3-dimethylaminopropylidene)-6,11-dihydrodibenz[b,e]oxepine.—Five grams of the cis/trans mixture of 11-(3-dimethylaminopropylidene) 6,11-dihydrodibenz-[b,e]-oxepine hydrochloride prepared by the procedure of Examples VI and XII, M.P. 188–189° C., is converted to the free base and then to the maleate salt, M.P. 168–169° C. Several recrystallizations from ethanol afford a pure isomeric maleate, M.P. 172–173. This is reconverted to the free base and then to the hydrochloric acid-addition salt. This is purified by recrystallization from a mixture of ethanol and ether; M.P. 192–193° C.

The other pure isomer is isolated by the concentration of the crystallization liquors to dryness, followed by converting the residue to the free base and then converting the base to the hydrochloric-acid addition salt. After recrystallization from a mixture of ethanol and ether, the salt has a M.P. of 209–210.5° C.

EXAMPLE XV 11-(3-monomethylaminopropylidene)-6,11 - dihydrodibenz-[b,e]-oxepine hydrochloride, M.P. 226–226.5° C.— The mixture of isomers obtained by the procedure of Example VII is separated by the fractional crystallization technique of Example XIV. There are obtained two isomeric hydrochlorides, one of which, after recrystallization from a mixture of ethanol and ether, melts at 225–226.5° C.

The hydrochloride of this isomer, 2.3 g. is converted to the free base and the base is treated with 97% formic acid, 0.9 ml., and 37% aqueous formaldehyde, 1.92 ml. The mixture is heated for 1.5 hours on a steam bath then is diluted with 100 ml. of water, is rendered strongly basic with 10% sodium hydroxide solution and the liberated product is extracted three times with 50 ml. portions of benzene. The benzene layers are combined and the benzene is removed by distillation. The residue is dissolved in 10 ml. of ethanol and is acidified with ethereal hydrogen chloride. The salt, which precipitates, is removed by filtration and is recrystallized from a mixture of ethanol and ether. There is obtained the pure isomeric hydrochloric acid-addition salt of 11-(3-dimethylaminopropylidene) - 6,11 - dihydrodibenz-[b,e]-oxepine, M.P. 209–210.5° C.

19

EXAMPLE XVI

Isomerization of isomeric 11-(3-dimethylaminopropylidene)-6,11-dihydrobenz - [b,e] - oxepine hydrochloride M.P. 192–193° C.—The isomer, isolated by the procedure of Example XIV, 50 mg., is heated in 5 ml. of 1 N hydrochloric acid on a steam bath for 4 hours. The mixture is evaporated to dryness and the residue which comprises a mixture of the isomeric cis/trans hydrochlorides is separated by the fractional crystallization technique of Example XIV into the hydrochloride of 11-(3-dimethylaminopropylidene) - 6,11 - dihydrodibenz-[b,e] oxepine, M.P. 192–193° C. and the hydrochloride of 11-(3-dimethylaminopropylidene) - 6,11-dihydrodibenz-[b,e] oxepine, M.P. 209–210.5° C., which latter isomer has the hereinbefore described enhanced pharmacological activity.

What is claimed is:

1. A compound of the formula

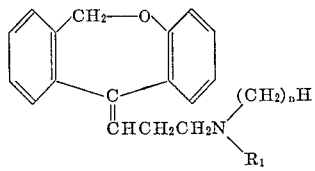

wherein $n$ is a whole number from 0 to 1 and $R_1$ is alkyl having from 1 to 4 carbon atoms.

2. The isomer of 11-(3-dimethylaminopropylidene)-6,11-dihydrodibenz-[b,e]-oxepine which forms a hydrochloric acid-addition salt, M.P. 209–210.5° C.

3. The isomer of 11-(3-dimethylaminopropylidene)-6,11-dihydrodibenz-[b,e]-oxepine which forms a hydrochloric acid-addition salt, M.P., 192–193° C.

4. The isomer of 11-(3-methylaminopropylidene)-6,11-dihydrodibenz-[b,e]-oxepine which forms a hydrochloric acid-addition salt, M.P., 225–226.5° C.

5. A compound of the formula:

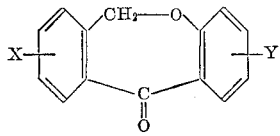

wherein X and Y are each selected from the group consisting of hydrogen, alkyl having from 1 to 4 carbon atoms, alkoxy having from 1 to 4 carbon atoms, thioalkoxy having from 1 to 4 carbon atoms, chloro, fluoro, trifluoromethyl, acyl having from 1 to 4 carbon atoms and dialkylsulfonamido having from 1 to 8 carbon atoms.

6. The compound of the formula

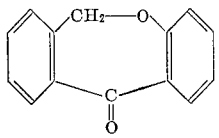

7. The compound of the formula

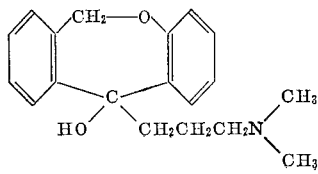

20

8. A compound of the formula

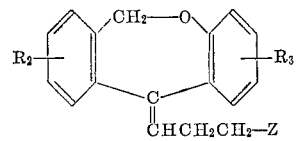

wherein $R_2$ and $R_3$ are each a member of the group consisting of hydrogen, fluoro, chloro, lower alkyl, lower alkoxy, lower alkylthio, and trifluoromethyl and Z is di-lower-alkylamino.

9. A compound selected from the group consisting of those of the formula:

[structure]

and the acid addition salts thereof, wherein X and Y are each selected from the group consisting of hydrogen, alkyl having from 1 to 4 carbon atoms, alkoxy having from 1 to 4 carbon atoms, thioalkoxy having from 1 to 4 carbon atoms, chloro, fluoro, trifluoro-methyl, acyl having from 1 to 4 carbon atoms and dialkylsulfonamido having from 1 to 8 carbon atoms; $n$ is a whole number from 0 to 1; and $R_1$ is selected from the group consisting of alkyl having from 1 to 4 carbon atoms, allyl and cycloalkyl having from 3 to 4 carbon atoms.

10. A compound selected from the group consisting of those of the formula:

[structure]

and the acid addition salts thereof, wherein X and Y are each selected from the group consisting of hydrogen, alkyl having from 1 to 4 carbon atoms, alkoxy having from 1 to 4 carbon atoms, thioalkoxy having from 1 to 4 carbon atoms, chloro, fluoro, trifluoro-methyl, acyl having from 1 to 4 carbon atoms and dialkylsulfonamido having from 1 to 8 carbon atoms; $n$ is a whole number from 0 to 1; and $R_1$ is selected from the group consisting of alkyl having from 1 to 4 carbon atoms, allyl and cycloalkyl having from 3 to 4 carbon atoms.

References Cited

Stach et al.: "Angewandete Chemie," vol. 74, pp. 31–32, Jan. 7, 1962.

NORMA S. MILESTONE, *Primary Examiner.*

U.S. Cl. X.R.

260—240, 476, 473, 520, 515, 516, 544; 424—278